(12) United States Patent
Kachnic et al.

(10) Patent No.: US 7,917,247 B2
(45) Date of Patent: Mar. 29, 2011

(54) AUXILIARY COMMUNICATION INTERFACE SYSTEM AND METHOD THEREOF

(76) Inventors: Edward Kachnic, Douglasville, GA (US); Larry Scarbrough, Marietta, GA (US)

( * ) Notice: Subject to any disclaimer, the term of this patent is extended or adjusted under 35 U.S.C. 154(b) by 1310 days.

(21) Appl. No.: 11/111,402

(22) Filed: Apr. 21, 2005

(65) Prior Publication Data

US 2006/0253222 A1 Nov. 9, 2006

(51) Int. Cl.
*G06F 19/00* (2006.01)
(52) U.S. Cl. ........................................................ 700/245
(58) Field of Classification Search .................. None
See application file for complete search history.

(56) References Cited

U.S. PATENT DOCUMENTS

| | | | | |
|---|---|---|---|---|
| 4,561,059 A * | 12/1985 | Davis et al. | ................... | 700/212 |
| 4,611,377 A * | 9/1986 | McCormick et al. | ...... | 29/407.05 |
| 4,870,590 A * | 9/1989 | Kawata et al. | ................ | 700/115 |
| 5,444,342 A * | 8/1995 | Matsuo et al. | ................ | 318/563 |
| 5,749,058 A * | 5/1998 | Hashimoto | ..................... | 701/23 |
| 6,900,686 B1 * | 5/2005 | Roo | .............................. | 327/403 |
| 2004/0186929 A1 * | 9/2004 | Salerno | .......................... | 710/16 |
| 2006/0072251 A1 * | 4/2006 | Ross et al. | ......................... | 361/1 |
| 2006/0108411 A1 * | 5/2006 | Macurek et al. | .............. | 235/375 |
| 2006/0125322 A1 * | 6/2006 | Foard | ............................ | 307/112 |
| 2006/0224811 A1 * | 10/2006 | Sichner et al. | ................ | 710/306 |

* cited by examiner

*Primary Examiner* — Dalena Tran
*Assistant Examiner* — Nicholas Kiswanto
(74) *Attorney, Agent, or Firm* — Myers Business Law, LLC; Joel D. Myers

(57) ABSTRACT

An auxiliary communication system and method, wherein system components can be electrically isolated, wherein a machine controller and a robot can communicate according to standard protocols, and wherein auxiliary equipment can be incorporated into the communication system, thereby alleviating the need for and the voltage limitations of auxiliary I/O boards.

5 Claims, 8 Drawing Sheets

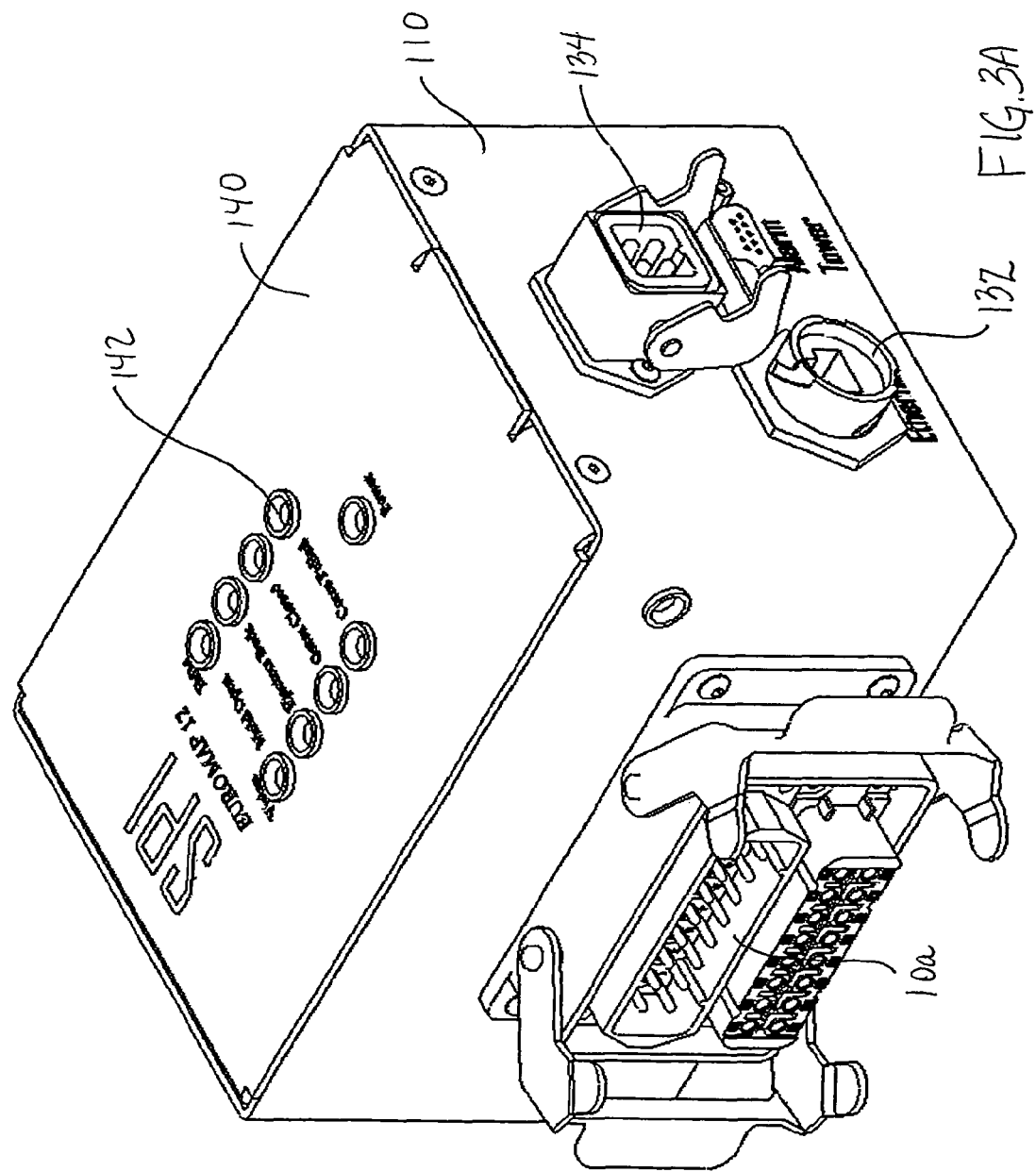

AUXILIARY COMMUNICATION INTERFACE SYSTEM AND METHOD THEREOF

TECHNICAL FIELD

The present invention relates generally to communication interface devices and methods, and more specifically, to an auxiliary communication interface system and method for enabling auxiliary equipment to utilize a standardized interface between a part-forming machine controller and robot controller for communication while successfully maintaining electrical isolation of the auxiliary equipment, the machine controller and the robot controller.

BACKGROUND OF THE INVENTION

Formed parts are generally created via molds, dies and/or by thermal shaping, wherein the use of molds remains the most widely utilized. There are many methods of forming a part via a mold, such as, for exemplary purposes only, stretch-blow molding, extrusion blow molding, vacuum molding, rotary molding and injection molding. Injection molding is one of the most popular methods and is a method wherein the utilization of auxiliary equipment, such as machine vision methodology, can increase efficiency via improved quality of task performance and increased part production.

Machine vision systems are exemplary auxiliary components that are relied upon throughout a vast array of industries for computerized inspection of parts and assistance in, direction of, operational control of automated and semi-automated systems for the production and/or manipulation thereof. In each instance, a variety of sensory data is acquired from a target site and is analyzed by a computer according to a comparative or otherwise objective specification. The analysis results are reported to a controller, via an I/O board, whereby machine decisions are influenced and/or actions are directed as a result thereof.

Robots are often utilized, wherein machine vision systems may be coordinated therewith to influence the operation thereof via communications regarding a part. As such, signals to and from the part-forming machine controller in response to the image analysis are critical to ensure proper and timely automatic cycling. These signals must be swiftly and accurately communicated to the robot controller, and vice versa.

Robots can be configured and utilized for a variety of duties related to tending molding machines, taking the parts and sprue from the mold, loading inserts such as studs, bushings or fittings and depositing parts at an appropriate station, thereby keeping operators away from dangerously hot molds and ensuring repeatability of operations. For example, a robot can be utilized to demold complex shapes and handle upstream or downstream operations, grasp a workpiece, and/or perform various operations thereon, such as, plastic welding, component assembly, and drilling. Where variations are inherently introduced by the system, such as from part shrinkage during cooling after plastic blow-molding, precise information is necessary for robots to accurately locate and identify a target workpiece and to prevent robot collisions. In one system, a plurality of cameras view images of each plastic part from a variety of angles, comparing same with ideal part dimensions in order to report offsets for robot path adjustment. In this manner, automation can be adapted in response to vision guidance. Further, more sophisticated robots can perform part inspection, degating, printing, labeling and packaging, often serving more than one machine.

Typical systems require the use of separate communication interfaces to process signals between a machine, a robot, and auxiliary devices, such as vision system components. This methodology disadvantageously duplicates I/O interfaces. Further, while each robotic implementation and sensory improvement can and does increase quality and productivity for part-forming processes, as well as other machine applications, resultant complexities in communications and attendant electrical risks between components introduce practical limitations. Therefore, the maintenance of electrical isolation for each major component is desirable.

Therefore, it is readily apparent that there is a need for an auxiliary communication system and method, wherein system components can be electrically isolated, wherein a machine controller and a robot can communicate according to standard protocols, and wherein auxiliary equipment can be incorporated into the communication system, thereby alleviating the need for and the limitations of auxiliary I/O boards and avoiding the above-discussed disadvantages.

BRIEF SUMMARY OF THE INVENTION

Briefly described, in a preferred embodiment, the present invention overcomes the above-mentioned disadvantages and meets the recognized need for such a device by providing an auxiliary communication system and method for enabling auxiliary equipment to utilize a preexisting, standardized machine controller and robot interface for communication, while successfully maintaining electrical isolation of the auxiliary equipment, the machine controller and the robot controller.

According to its major aspects and broadly stated, the present invention is an auxiliary communication system and method, wherein system components can be electrically isolated, wherein a machine controller and a robot can communicate according to standard protocols, and wherein auxiliary equipment can be incorporated into the communication system, thereby alleviating the expense and voltage limitations introduced by duplication of auxiliary I/O boards.

More specifically, the device of the present invention in its preferred form is a communication interface device comprising a standardized electrical interface from the molding machine controller to the robot controller, a 32-pin connector which has up to 16 inputs and 16 outputs. A system of relays is provided, whereby the standardized electrical interface can be shared by one or more auxiliary devices, such as, for exemplary purposes only, a vision system or other sensory device. The auxiliary communication interface device of the present invention is capable of, in an electrically isolated fashion, directing inputs and outputs to and from auxiliary device(s) to part-forming machine controller(s) and to the robot controller(s), thereby effectively replacing the I/O board of the auxiliary device(s). The configuration of the relays facilitates the maintenance of electrical isolation between each component, yet enables solid communication therebetween. In the preferred embodiment, the communication interface device of the present invention comprises single throw, double pole relays, wherein two isolated sets of contacts are activated when the relay is energized and the circuit path of each set of contacts is incomplete when the relay is de-energized.

Thus, a feature and advantage of the present invention is the ability of such a method and device to enable auxiliary equipment to utilize a standardized interface between a machine controller and robot controller for communication while successfully maintaining electrical isolation therebetween.

Another feature and advantage of the present invention is the ability of such a method and device to enable isolated, concurrent signal flow to more than one component in a machine system.

Another feature and advantage of the present invention is the ability of such a method and device to eliminate costly duplication of auxiliary I/O boards.

Another feature and advantage of the present invention is the ability of such a method and device to maintain a standardized SPI and EUROMAP 32-pin interface between a molding machine controller and a robot controller.

Another feature and advantage of the present invention is the ability of such a method and device to effectively incorporate auxiliary equipment into the preexisting, standardized part-forming machine controller and robot controller interface for communication, while successfully maintaining electrical isolation between each component.

These and other objects, features and advantages of the invention will become more apparent to one skilled in the art from the following description and claims when read in light of the accompanying drawings.

BRIEF DESCRIPTION OF THE DRAWINGS

The present invention will be better understood by reading the Detailed Description of the Preferred and Alternate Embodiments with reference to the accompanying drawing figures, in which like reference numerals denote similar structure and refer to like elements throughout, and in which:

FIG. 3A is a first perspective view of an auxiliary communication device according to the preferred embodiment of the present invention;

DETAILED DESCRIPTION OF THE PREFERRED AND ALTERNATE EMBODIMENTS

In describing the preferred and alternate embodiments of the present invention, as illustrated in the figures and/or described herein, specific terminology is employed for the sake of clarity. The invention, however, is not intended to be limited to the specific terminology so selected, and it is to be understood that each specific element includes all technical equivalents that operate in a similar manner to accomplish similar functions.

To better understand the present system and method of this invention, it will be specifically explained in the context of a particular machine system, that is, its preferred use in conjunction with an injection molding system. However, it is expressly understood and contemplated that the auxiliary communication interface system and method described herein is suitable for utilization in combination with any machine part-molding method, such as, for exemplary purposes only, stretch-blow molding, extrusion blow molding, vacuum molding, rotary molding, die cast and injection molding.

Figure 1:
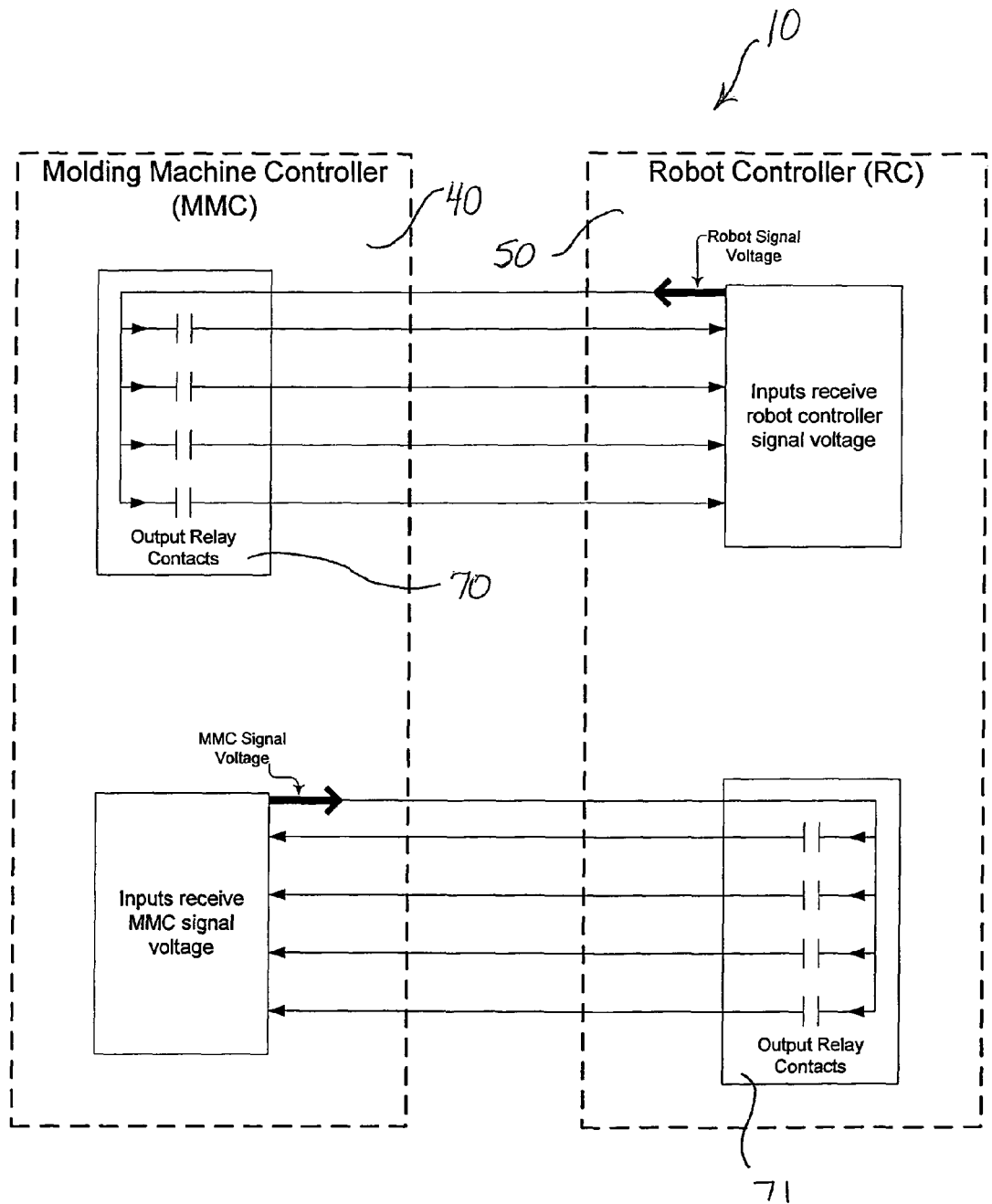
FIG. 1 is a functional diagram of a molding machine controller and a robot controller interface according to a prior-art implementation.

Referring first to FIG. 1, a functional diagram of a standardized interface 10 between a molding machine controller 40 and a robot controller 50, according to a prior-art implementation, is shown, wherein standardized interface 10 is a 32-pin connection 20 (not shown) between injection molding machine (IMM) 40 and robot 50. According to SPI "Recommended Guidelines for Robot/Injection Molding Machine Electrical Interface," and EUROMAP 12 "Electrical Interface Between Injection Moulding Machine and Handling Device," the 32-pin connection 20 performs as a physical link between robot 50 and IMM 40, wherein there are 16 male and 16 female pins in each 32-pin connection 20.

Other specifications for standardized interface 10, according to the SPI and EUROMAP Guidelines, include: (1) the current of the signals must not exceed 200 mA, (2) the voltage of the signals must not exceed 250 Vac, (3) pulse width must not be less than 0.5 seconds, and (4) all signals are maintained signals. The standardized connector pin assignments/contact functions for electrical signals from IMM 40 to robot 50, and from robot 50 to IMM 40, wherein IMM 40 is a horizontal IMM, are summarized in the following chart:

| PINS | FUNCTION (IMM to Robot) | PINS | FUNCTION (Robot to IMM) |
|---|---|---|---|
| 1/9 | Emergency Stop (IMM) | 17/32 | Permit Clamp Close |
| 2/16 | Mold Fully Open | 18/26 | Enable Clamp Motion |
| 3/11 | Gates Closed | 19/27 | Emergency Stop |
| 4/16 | Ejector Fully Retracted | 20/32 | Robot Non-Operational |
| 5/16 | Ejector Fully Forward | 21/32 | Permit Ejector Retract |
| 6/16 | Core Fully Set | 22/32 | Permit Ejector Forward |
| 7/16 | Core Fully Pulled | 23/32 | Permit Core Pull |
| 8/16 | Reject Part | 24/32 | Permit Core Set |
| 10/16 | Fully Automatic (Permit Robot Operation) | 25/32 | Spare |
| | | 26/32 | Permit Clamp Motion |
| 12/16 | Mold Fully Closed | 27/32 | Emergency Stop (Robot) |
| 13/16 | Spare | 28/32 | Optional |
| 14/16 | Optional | 29/32 | Spare |
| 15/16 | No Part Available | 30 | Spare |
| | | 31 | Spare |

Accordingly, as depicted in FIG. 1, signal voltage from robot 50 to IMM 40 is thus directed through plurality of IMM output control relays 70, wherein for example, if contact 72 (not shown) at pin connection 2 is closed by IMM 40, the relay is energized, signaling robot 50 the "Mold Fully Open" position. Conversely, signal voltage from IMM 40 to robot 50 is directed through plurality of output control relays 71, wherein for example, if contact 73 at pin connection 17 is closed by robot 50, the relay is energized and IMM 40 is signaled to "Permit Clamp Motion."

In this prior-art arrangement, in order for auxiliary equipment 100 (seen in FIG. 2) to be incorporated into the machine/robot part-forming system, auxiliary equipment 100 must have an I/O relay board to facilitate communication between, for example, camera 108 (not shown), IMM 40, and robot 50. Equipping each piece of auxiliary equipment can be disadvantageously expensive, in addition to introducing potentially limiting performance characteristics into the system.

Figure 2:
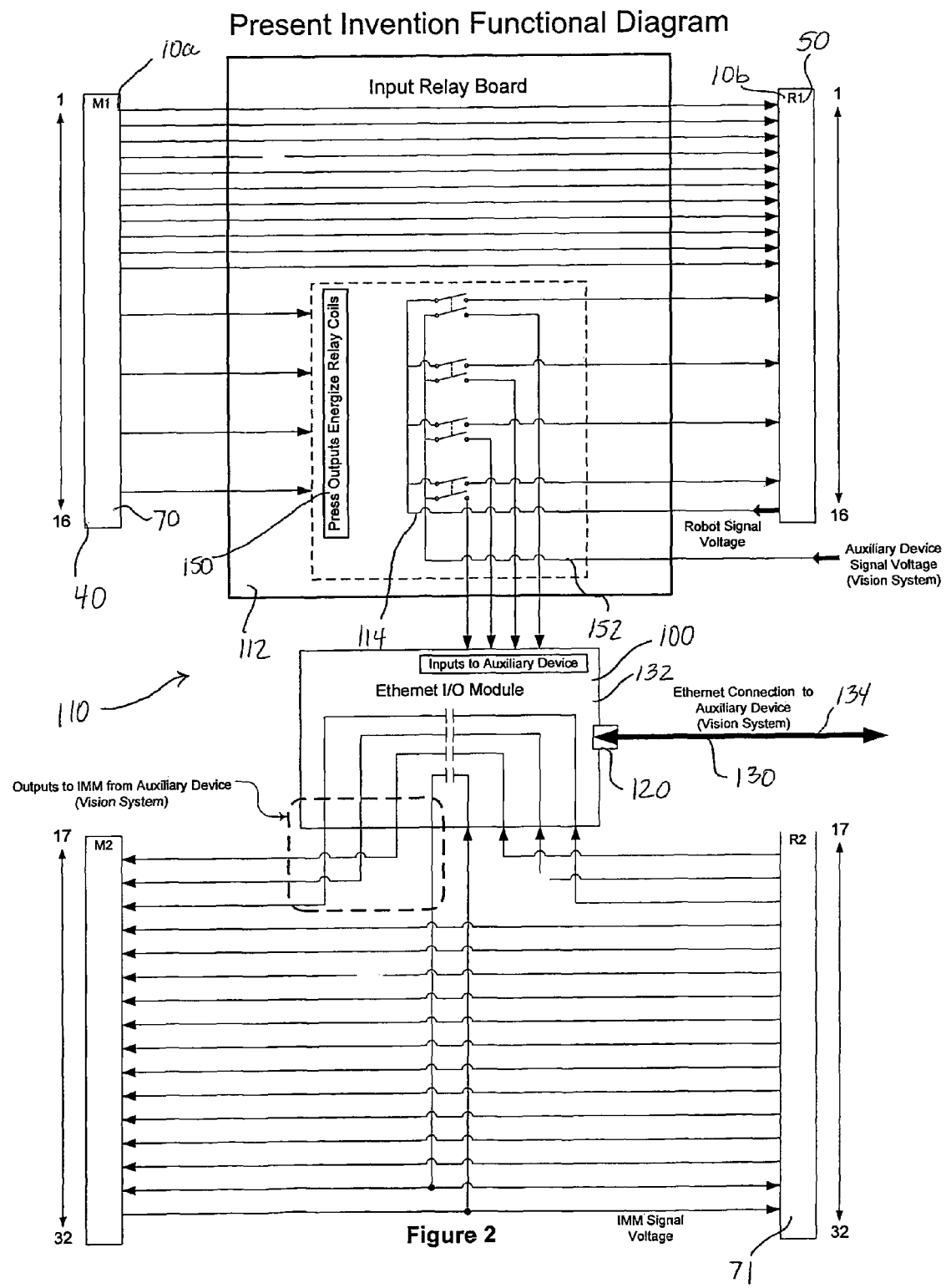
FIG. 2 is a functional wiring diagram of a molding machine controller and a robot controller interfaced via an auxiliary communication device according to the preferred embodiment of the present invention.

Referring now to FIG. 2, a functional diagram is shown of IMM 40 and robot 50 interfaced via auxiliary communication interface device 110, according to the preferred embodiment of the present invention, whereby auxiliary equipment 100 is effectively incorporated into the preexisting, standardized machine controller and robot controller interface for communication, while successfully maintaining electrical isolation between each component. That is, although system components are protectively, electrically isolated, IMM 40 and robot 50 can communicate according to standard SPI and EUROMAP protocols, and auxiliary equipment 100 can be incorporated into the communication system, thereby alleviating the need for and the limitations of auxiliary I/O boards, preferably relying, instead, upon Ethernet communications via third-party computer/intelligent controller 120.

Figure 6:
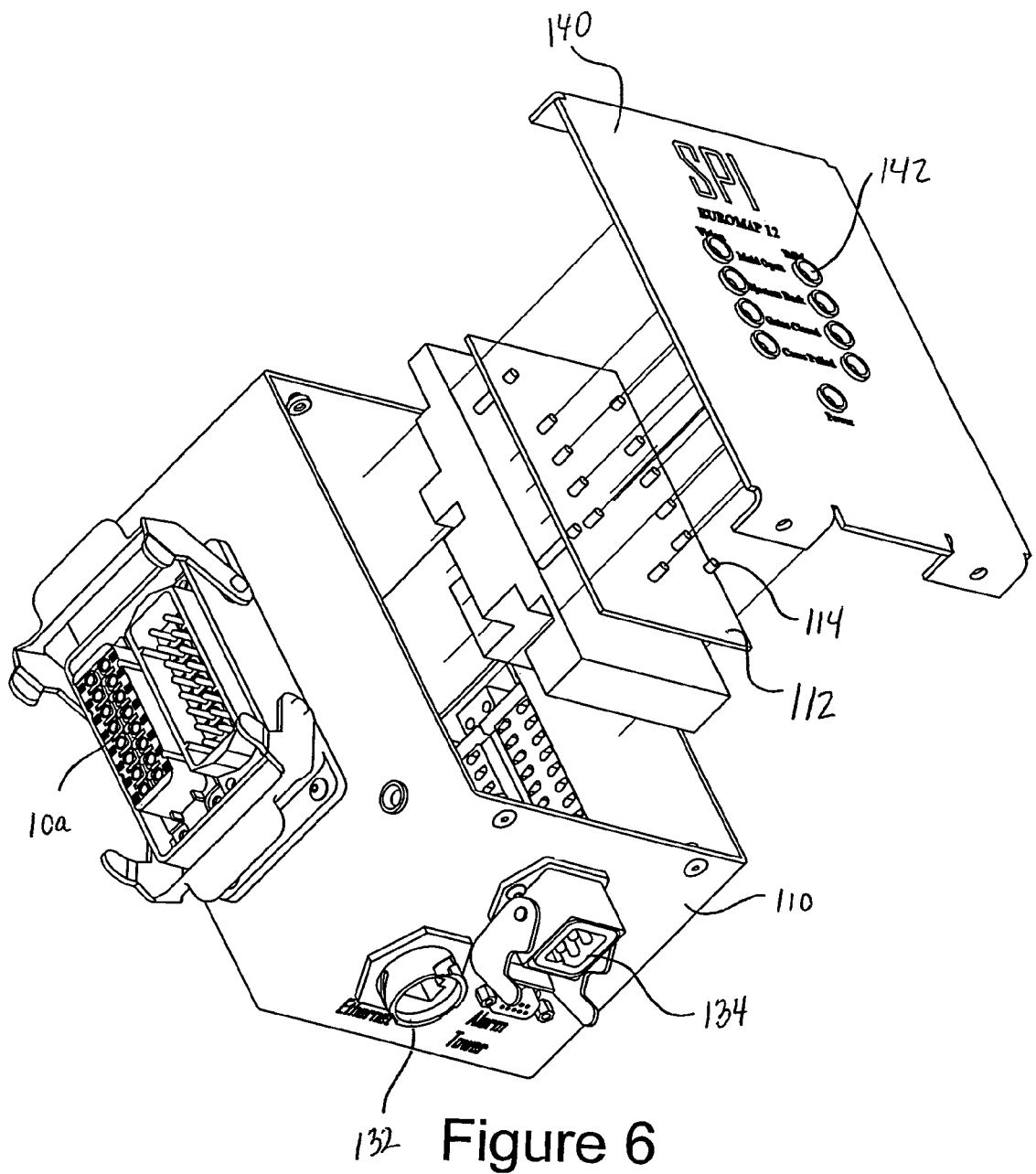
FIG. 6 is a perspective, exploded view of an auxiliary communication device according to the preferred embodiment of the present invention.

Referring to FIG. 6, the preferred form of auxiliary communication interface device 110 comprises relay board 112 with plurality of relays 114. Preferably, each relay of plurality of relays 114 is a Single Throw, Double Pole relay, whereby energy flows separately and isolatedly from one source through two contacts, thus enabling the coincident voltage flow from IMM 40 to robot 50 and to auxiliary output 130. One skilled in the art should recognize that plurality of relays 114 could include other types and/or combinations of relays. For example, two Single Throw, Single Pole relays could be utilized in place of one Single Throw, Double Pole relay. Or, in order to accommodate different system configurations, other types or combination of relays could be utilized.

Figure 3B:
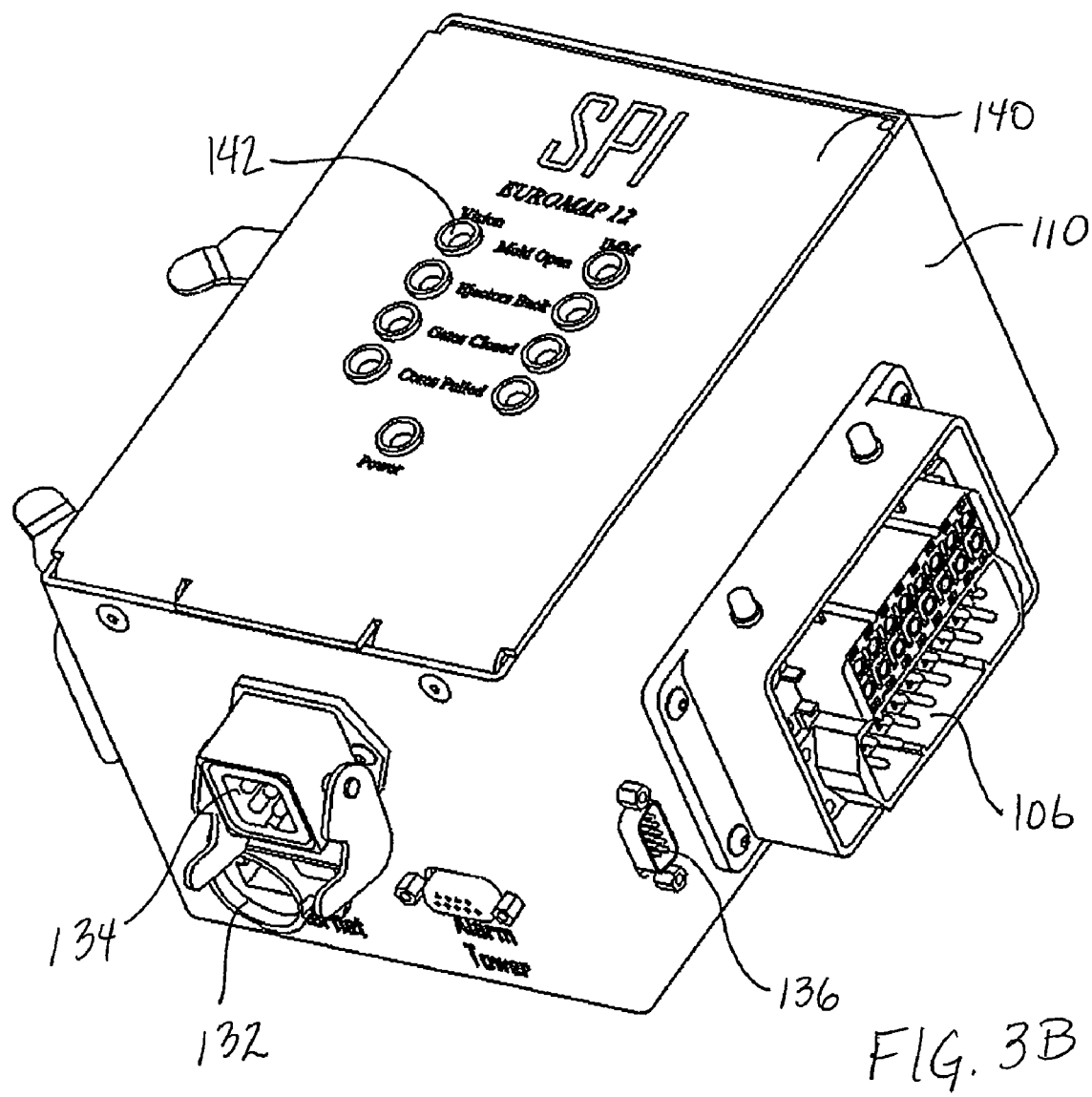
FIG. 3B is a second perspective view of an auxiliary communication device according to the preferred embodiment of the present invention.
Figure 4:
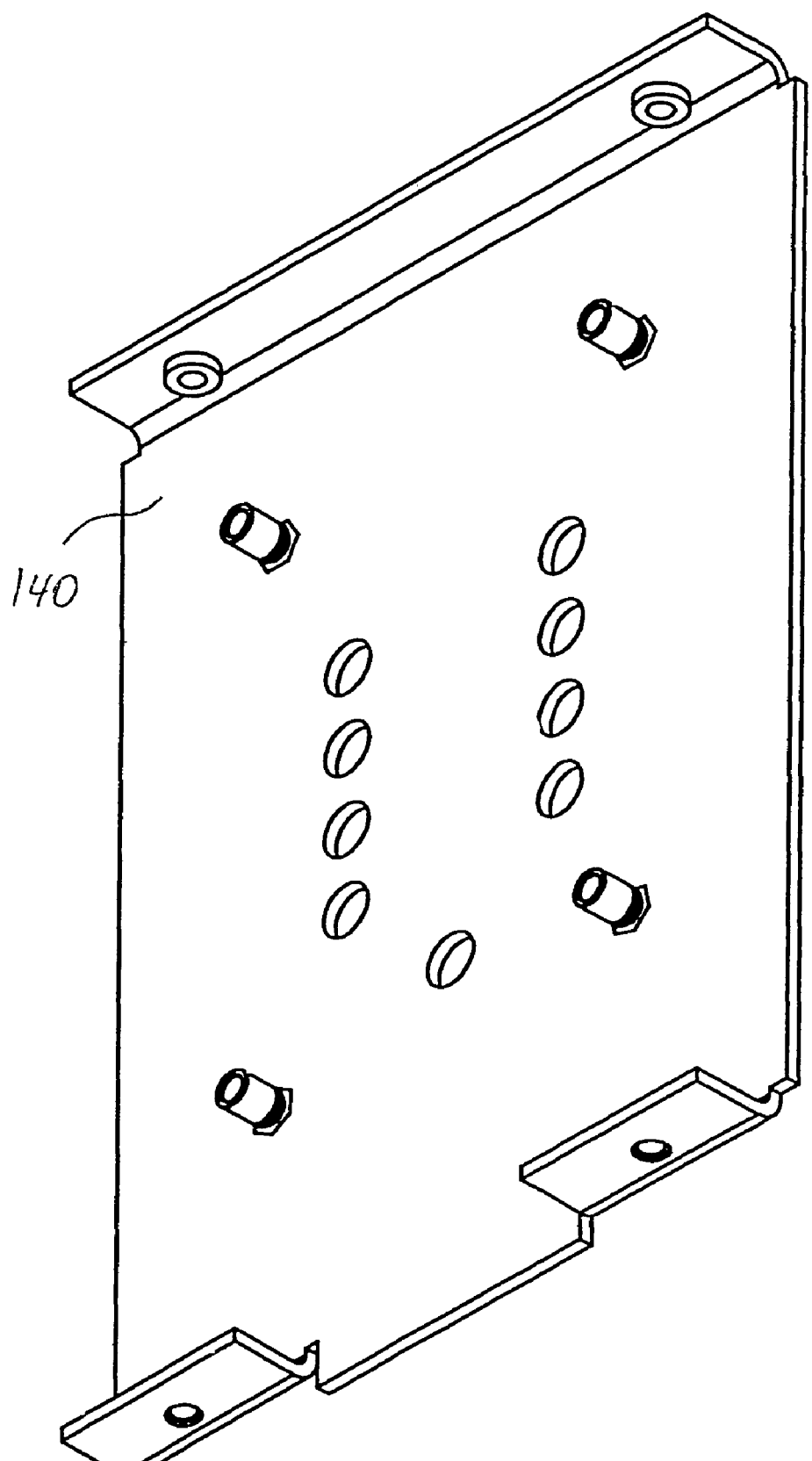
FIG. 4 is a perspective view of the lid of an auxiliary communication device according to the preferred embodiment of the present invention.

In the preferred embodiment, auxiliary output 130 is I/O relay board 132 adapted to receive voltage signals and transmit Ethernet communications via Ethernet connection 134, as seen in FIGS. 3A and 3B. Alternately, direct voltage output could be utilized, via voltage connection 134, wherein third-party computer/intelligent controller 120 could be equipped with an I/O relay board.

Figure 5A:
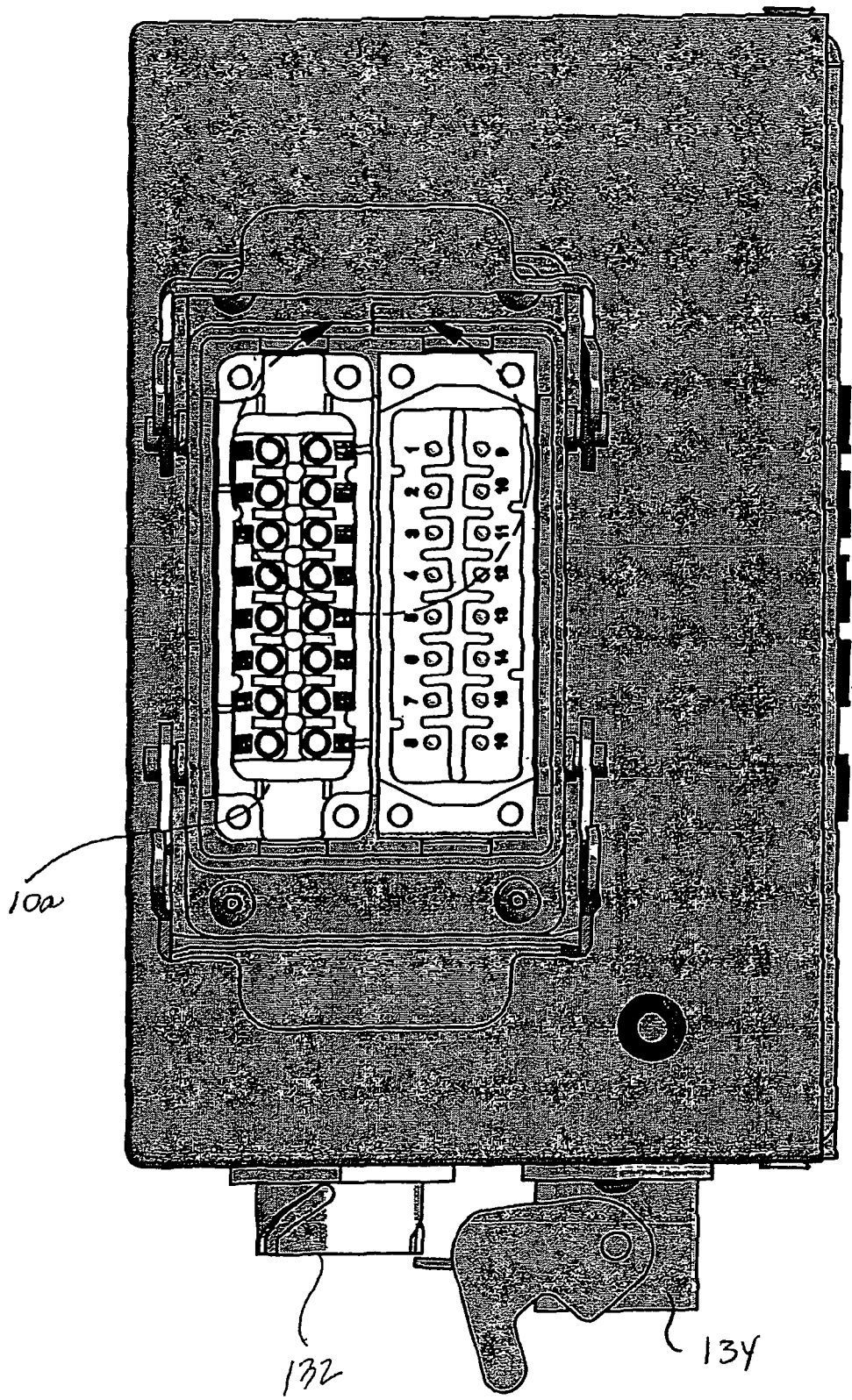
FIG. 5A is a first side view of the auxiliary communication device of FIG. 3A, showing a first 32-pin connector.
Figure 5B:
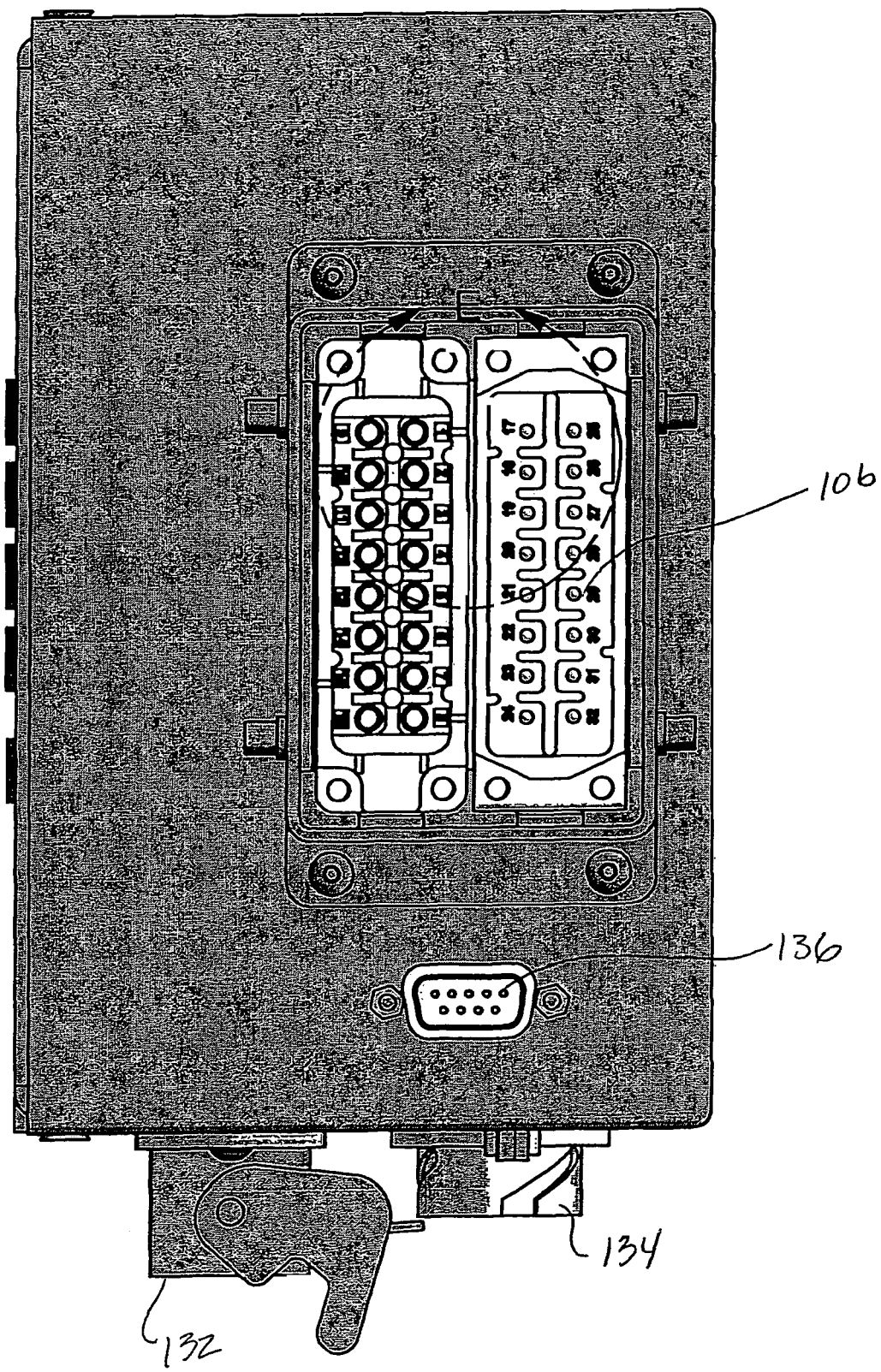
FIG. 5B is a second side view of the auxiliary communication device of FIG. 3B, showing a second 32-pin connector.

Referring now to FIGS. 3A, 3B and 5A, auxiliary communication interface device 110 preferably comprises standardized electrical interface 10a from IMM 40 (not shown), via relay board 112 (not shown), to robot 50 (not shown), and standardized electrical interface 10b from robot 50, via relay board 112, to IMM 40. These 32-pin connectors 10a and 10b preferably have 16 inputs and 16 outputs, with assigned functions as per SPI and EUROMAP Guidelines. Relay board 112 is preferably positioned within auxiliary communication interface device 110, wherein plurality of relays 114 receive voltage input and direct voltage output to robot 50 and also to auxiliary equipment 100, preferably via Ethernet connection 132 and third-party computer/intelligent controller 120. Serial communication port 136 is preferably provided to enable the transfer of information, e.g. program intelligence, via I/O relay board 132.

In the preferred embodiment, lid 140 is adapted with plurality of visual indicators 142, preferably LED, wherein each visual indicator 142 offers a display when the corresponding relay is energized. For example, in the preferred embodiment, plurality of visual indicators 142 comprises mold open, ejector retracted, gates closed, and core pulled indicators.

One skilled in the art will recognize that although camera 108 has been discussed as the preferred type of auxiliary equipment 100, any type of sensory or other format auxiliary device(s) could be utilized, wherein sensory devices could include, for example, an infrared (IR) camera for acquiring visual near-infrared images, a CMOS (complementary metal oxide semiconductor) or CCD (charge-coupled device) array electronic camera for acquiring visual images in electronic pixel format, a video data collection terminal, an ultrasonic sensor or any suitable optical imaging device capable of generating computer readable image data of a visual representation, wherein the image may be in any suitable format such as, for exemplary purposes only, mega pixel format, video graphic array (VGA), common intermediate format (CIF), quarter common intermediate format (QCIF), or any other format suitable for such an image capture and transmission application. Further, a coherent fiber optic bundle could be incorporated, wherein light waves and/or radiation could be captured thereby and allowed to travel therethrough to a sensory device.

It should further be noted that although the auxiliary communication interface device 110 of the present invention is described in combination for use with an injection molding machine, it may be utilized with any part-forming machine or any other type of automated or semi-automated production, inspection and/or assembly system wherein machine sensory inspection analysis may be incorporated and/or any other type of auxiliary equipment and/or robotic assistance is desirable. It should also be noted that any number or combination of auxiliary equipment devices 100 may be utilized.

In an alternate embodiment, external software could control one or more of the relays, wherein code could be transmitted via serial port 136 to energize or de-energize the relay. For example, even codes could be utilized to de-energize relays and odd codes to energize relays, wherein the responsive relay switch would remain open until a subsequent control code is received.

In another alternate embodiment of the present invention, auxiliary output 130 could be wireless, wherein wirelessly linked computer or microprocessor and/or auxiliary equipment 100 could communicate data from remote positions, wherein data could be transmitted via spread-spectrum radio frequency, infrared signal communication platforms, or any other suitable wireless transmission system.

In another alternate embodiment, the auxiliary communication interface system and method of the present invention could incorporate Power Loss Interlock methodologies, as described in U.S. Pat. No. 5,993,039, wherein relay board 112 could carry suitable components to enable all outputs to be returned to a safe state upon loss of power.

In use, IMM 40 and robot 50 are interfaced via auxiliary communication interface device 110, according to the preferred embodiment of the present invention, whereby auxiliary equipment 100 is effectively incorporated into the preexisting, standardized machine controller and robot controller interface for communication, while successfully maintaining electrical isolation between each component, as shown in the preferred functional wiring diagram of FIG. 2. Although voltage may flow in either direction between each of the linked components, thereby directing the flow of information, by way of particular example, signal voltage from IMM 40 to robot 50 is directed from standardized electrical interface 10a to plurality of input control relays 150 of relay board 112 and then to plurality of relays 114, preferably Single Throw, Double Pole relays.

Thereafter, the first pole connection preferably enables signal voltage to travel through plurality of first output control relays 152 to standardized electrical interface 10b for robot 50. Coincidently, the second pole connection preferably enables signal voltage to travel through plurality of second output control relays 154, wherein the preferred incorporation of I/O board 132 enables signal transmission via Ethernet communication connection 134. Preferably, Ethernet communication connection 134 transmits signal data to third-party computer/intelligent controller 120, and to auxiliary equipment 100. Preferred Ethernet communication connection 134 receives data from serial communication port 136-

(not shown), and also preferably transmits signal data to physical output 160 (not shown), wherein power and ground supply resources are linked to a remote alarm tower.

Accordingly, for example, if a contact at pin connection 2/16 is closed, e.g. the relay is energized, IMM 40 is sending a voltage signal via input relay pin 2 to relay board 112 confirming mold fully open. The signal is output via output relay pin 2 and received by robot 50 at pin 2 of standardized electrical interface 10*b*. Coincidently, the signal is output via pin 1 of second output control relays 154, and transmitted via Ethernet communication connection 158*a* to third-party computer/intelligent controller 120 and to auxiliary equipment 100.

Having thus described exemplary embodiments of the present invention, it should be noted by those skilled in the art that the within disclosures are exemplary only, and that various other alternatives, adaptations, and modifications may be made within the scope of the present invention. Accordingly, the present invention is not limited to the specific embodiments illustrated herein, but is limited only by the following claims.

What is claimed is:

1. An auxiliary communication interface device, comprising:
   a multi-pin machine connection removably connected to a machine;
   a multi-pin robot connection removably connected to a robot disposed proximate the machine;
   a relay board disposed proximate the machine and the robot and within a common operation range of the machine and the robot;
   a first plurality of input relays adapted to receive voltage signals from said multi-pin machine connections;
   a second plurality of input relays adapted to receive voltage signals from said multi-pin robot connection;
   said first and said second plurality of input relays adapted to transmit voltage signals to a first plurality of output relays, a second plurality of output relays, and a third plurality of output relays,
   wherein said first plurality of output relays is adapted to transmit voltage signals to said multi-pin machine connection,
   wherein said second plurality off output relays is adapted to transmit voltage signals to said multi-pin robot connection,
   wherein said third plurality of output relays is adapted to transmit voltage signals to an Input-Output board;
   wherein said Input/Output board is adapted to receive voltage signals and to transmit communication signals;
   an Ethernet port; and
   a serial communication port wherein said serial communication port provides information via said relay board.

2. The auxiliary communication interface device of claim 1, wherein said communication signals are Ethernet signals.

3. The auxiliary communication interface device of claim 1, wherein said communication signals are wireless signals.

4. The auxiliary communication interface device of claim 1, wherein said communication signals are digitized I/O signals.

5. The auxiliary communication interface device of claim 1, wherein said communication signals are infrared signals.

* * * * *